US010885701B1

(12) United States Patent
Patel

(10) Patent No.: US 10,885,701 B1
(45) Date of Patent: Jan. 5, 2021

(54) LIGHT SIMULATION FOR AUGMENTED REALITY APPLICATIONS

(71) Applicant: Amazon Technologies, Inc., Reno, NV (US)

(72) Inventor: Pratik Patel, San Mateo, CA (US)

(73) Assignee: Amazon Technologies, Inc., Seattle, WA (US)

(*) Notice: Subject to any disclaimer, the term of this patent is extended or adjusted under 35 U.S.C. 154(b) by 358 days.

(21) Appl. No.: 15/836,614

(22) Filed: Dec. 8, 2017

(51) Int. Cl.
| *G06T 15/50* | (2011.01) |
| *G06T 15/20* | (2011.01) |
| *G06T 15/60* | (2006.01) |
| *G06T 19/20* | (2011.01) |
| *A63F 13/213* | (2014.01) |
| *A63F 13/52* | (2014.01) |
| *A63F 13/35* | (2014.01) |
| *G06T 19/00* | (2011.01) |

(52) U.S. Cl.
CPC .......... *G06T 15/506* (2013.01); *A63F 13/213* (2014.09); *A63F 13/35* (2014.09); *A63F 13/52* (2014.09); *G06T 15/205* (2013.01); *G06T 15/60* (2013.01); *G06T 19/006* (2013.01); *G06T 19/20* (2013.01); *G06T 2215/16* (2013.01)

(58) Field of Classification Search
CPC ..... G06T 15/506; G06T 15/205; G06T 15/60; G06T 19/006; G06T 19/20; A63F 13/213; A63F 13/35; A63F 13/52
See application file for complete search history.

(56) References Cited

U.S. PATENT DOCUMENTS

| 8,405,680 B1 * | 3/2013 | Cardoso Lopes ....... G06T 19/00 345/426 |
| 10,380,803 B1 * | 8/2019 | Jaafar ................... G06T 19/006 |
| 2013/0141434 A1 * | 6/2013 | Sugden ................ G02B 27/017 345/426 |

* cited by examiner

*Primary Examiner* — William H McCulloch, Jr.
*Assistant Examiner* — Ankit B Doshi
(74) *Attorney, Agent, or Firm* — Hogan Lovells US LLP

(57) ABSTRACT

An augmented reality (AR) application allows for the specification of various lighting conditions, or lighting states, that can be simulated for an augmented reality view of a scene. This can include, for example, specifying a time of day to cause the view to be rendered with a specific amount of sunlight, or specifying a state of various light sources that can impact the illumination of the scene. A light map and lighting state data can be determined for the scene. A change to the lighting state data can result in a filter being applied to the live view of the scene to cause the overall appearance to correspond to the target lighting state. Augmented reality content displayed with respect to the live view can be rendered to have an appearance that corresponds to the altered live view. AR content can also be used to update the appearance of shadows.

20 Claims, 10 Drawing Sheets

US 10,885,701 B1

LIGHT SIMULATION FOR AUGMENTED REALITY APPLICATIONS

BACKGROUND

The widespread adoption of portable computing devices, such as smartphones and tablet computers, has resulted in a corresponding increase in the amount and types of electronic content available to players. This includes the providing of augmented reality (AR) content, where a device can capture video content of a location and a computing device can render content such that it appears, at least as displayed on a screen of the device, that the content exists in that location. As the computing device moves, the view of the content can change accordingly, being rendered as if the content corresponds to an actual three-dimensional object being captured by the camera of the device at the appropriate location and angle. In order to improve the perceived realism of the AR content with respect to the surroundings, an attempt can be made to adjust the lighting of the AR content to match that of the scene and orientation. Conventional approaches, however, do not allow for different views for different times or lighting conditions. Further, conventional approaches do not adjust the appearance of the scene data in the live image to account for adjusted lighting conditions.

BRIEF DESCRIPTION OF THE DRAWINGS

Various embodiments in accordance with the present disclosure will be described with reference to the drawings, in which.

DETAILED DESCRIPTION

Figure 1A:
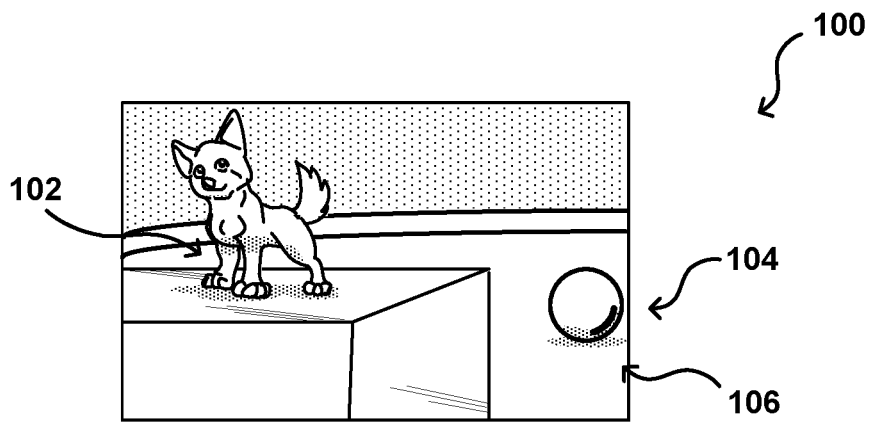
FIGS. 1A, 1B, and 1C illustrate example lighting states that can be applied to the rendering of augmented reality displays in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the presentation of dynamically rendered content, such as augmented reality (AR) content. In particular, various approaches enable a user to specify various lighting conditions, or lighting states, that can be simulated for an augmented reality view. This can include, for example, specifying a different time of day to cause the view to be rendered with more or less sunlight, as well as indicating whether to virtually turn on (or off) various light sources that can impact the illumination of the scene. A light map and lighting state data can be determined for the live view for current conditions, and one or more values of the lighting state data can be adjusted to change a displayed view to be presented. The change can include applying a filter to the live view of the scene to cause the overall brightness, or other such aspects, to correspond to the target lighting state. Augmented reality content displayed with respect to the live view can be rendered according to the target lighting state data to have an appearance that corresponds to the altered live view. Augmented reality content can also be used to update the appearance of shadows for the augmented reality content and/or live view in order to increase the realism of the lighting simulation. The image content can then be displayed under various different lighting conditions or for various lighting states, as may be useful when shopping for items electronically or otherwise obtaining multiple views of augmented reality content of interest.

Various other functions can be implemented within the various embodiments as well as discussed and suggested elsewhere herein.

There can be various situations where it may be desirable to render or provide augmented reality (AR) content to viewers through a number of different devices. For example, multiple players might be playing a multiplayer game wherein AR content is displayed to each of the players through a respective computing device. As known for AR content, the view and content displayed on each device can be a function of the location of the device in at least some embodiments, as well as the orientation (or changes in orientation) of the respective device. This enables each device to function as an augmented window on the world, where the augmented content will appear to exist in the real world when viewed through the display of the device, typically laid over a live camera view. The scale, angle, and location of the augmented content can move as appropriate with the change in location and/or orientation of the computing device.

FIG. 1A illustrates an example image 100 of augmented reality content that can be generated in accordance with various embodiments. In this example, image data is captured that represents various objects in a scene. As used herein, a "scene" refers generally to a collection of objects, such as foreground and background objects, visible in a physical location. A camera can capture an image of a portion of a scene, which will include representations of any foreground or background objects contained within a field of view of the camera. The field of view can change as the orientation, zoom, or other aspects of the camera change, such that the portion of the scene represented in the captured image data will change as well. In the image 100 displayed in FIG. 1A, the scene can include objects in a location such as a park or gaming field. This can include content such as a field, seating, lights, and other background objects, and in this object also includes a view of a physical ball 104 present in the scene and positioned with in the field of view of the camera. In the example image, an augmented reality (AR) object 102 is also rendered as an overlay or additional image layer with respect to image data captured for the scene. In various embodiments the image data can represent a "live" camera view wherein the image data displayed represents data currently being captured by the camera, with some amount of latency due to the capture and display process. It should be understood that the AR content does not need to be a separate layer or object but can be rendered into the image or otherwise generated with respect to the representation of the scene to appear as if the AR content is physically present in the scene.

As discussed in more detail later herein, information about the scene can be determined that will influence how the AR content is rendered. This can include, for example, determining distance and scale information for a location in the scene for which the AR content is to be rendered, and rendering the AR content with the appropriate size, scale, angle, and other such aspects. In various embodiments, an attempt can be made to match a lighting or appearance of the AR content to that of the scene in the image data. This can include, for example, determining aspects such as brightness or contrast levels of the scene and then using these levels for rendering of the AR content. Other aspects of the scene can be used as well, such as to determine a direction of lighting or type of shadow that can be applied to the AR object to make the AR object more closely match the appearance of the scene in the image.

There are various limitations to such an approach, however. For example, the lighting approach used to render the AR content will only be relevant for the currently captured image data, reflecting the current time. There is no flexibility in conventional approaches to select a different time, or lighting state, and render the AR content for that lighting state. Further, even if different lighting or rendering of an AR object is possible, conventional approaches do not adjust the view of the physical scene to cause the scene to appear as if it is also under the same lighting conditions for the specified lighting state. For example, there is no way to display a view of the scene to appear as if it is during the daytime if captured at night, or vice versa. Further, there is no way in conventional approaches to change the lighting of the scene data, or live view data, according to changes in the settings of one or more light sources for the scene.

Accordingly, approaches in accordance with various embodiments can provide for the adjustment of a lighting state for one or more light sources when rendering an augmented reality view for display. This can include, for example, receiving indication of a time of day for a particular location and applying a filter to adjust aspects of the scene data to correspond to a determined lighting state for that point in time, which can be a future time or point in the past. The augmented reality content can be rendered to match the corresponding lighting state. The specifying of a lighting state can also include whether to cause the scene and the AR object to appear to be lit by a specific light source, such as a lamp, as well as any relevant aspect of that light source, such as a brightness value if the light is on a dimmer switch or a light type if different bulbs or diodes can be used for the light source. In some embodiments a user might also be able to add a virtual light source to the scene, which can be used to illuminate objects in the view according to the aspects of the virtual light source. Various other options can be provided as well within the scope of the various embodiments.

Figure 1B:
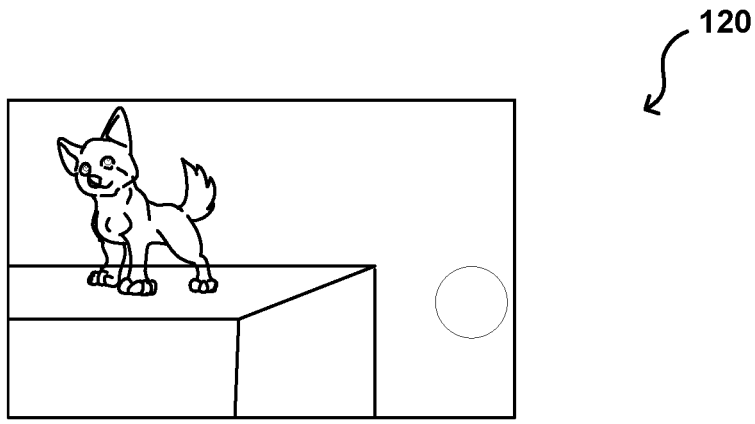

In the example image 120 of FIG. 1B, a lighting state for the AR view has been changed with respect to that of FIG. 1A. In FIG. 1A, the lighting state may have been sunlight at noon on a typical day, where an amount of light was generated by the sun overhead, in a particular location or direction with respect to the objects in the scene. This includes a direction of lighting and location of shadows. A determination of the light source, location, and intensity (as well as other potential aspects such as color) can be used to render the AR object to appear to match the scene, using intersections from a virtual light source as is known for shading and lighting in graphics rendering. It might be the case that a person having access to the AR view would like to see how the scene, including the AR object 102, would appear under darker conditions, such as might exist at dusk or during a period of low lighting. In accordance with various embodiments, the specified lighting state can be used to control the appearance of the AR scene. As illustrated in the image 120 of FIG. 1B, the same objects illustrated in FIG. 1A are displayed, but in this case both the scene data and the AR object appear to be captured in a state of low illumination. In some embodiments, this can include applying an appropriate filter to the live camera view in order to cause the scene data to appear to be illuminated using the low illumination. As discussed in more detail elsewhere herein, approaches in accordance with various embodiments can also adjust the physical shadows represented in the scene data to more closely correspond to the specified lighting state. The information for the lighting state can also be used to determine a type, amount, and/or direction of lighting to be used for rendering the AR content. The lighting effects applied to the AR object can help the AR object to be displayed with an appearance that more closely matches the specified lighting state, such that the AR object has a more realistic appearance when viewed along with the modified scene data. Adjustments to the lighting state can then be applied to both the scene data and the AR content, in order to enable the collection of content to be viewed under various lighting conditions.

Figure 1C:
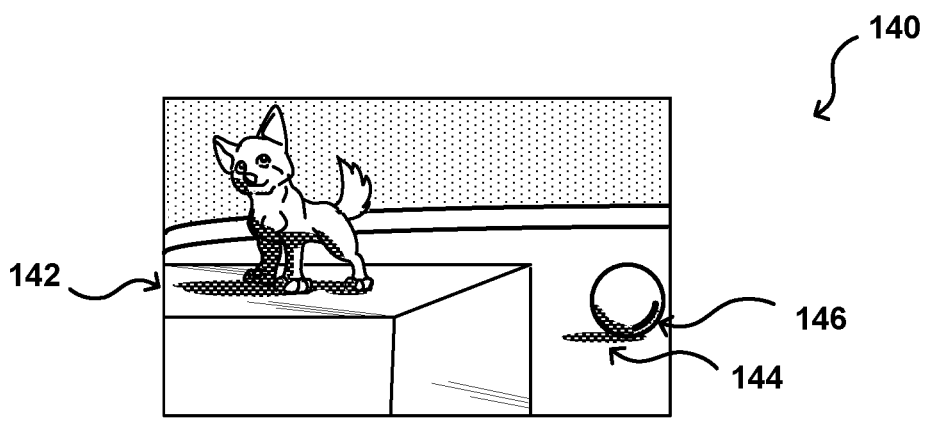

FIG. 1C illustrates an example image 140 of the same content for yet another lighting state. In this example, an additional light source has been identified, as may correspond to a physical light source in, or proximate, the scene. In this example, the lighting state data may indicate an evening time as in FIG. 1B, wherein there will be little to no sunlight illuminating the scene. In this example a light source has been set to an active state, wherein that light source will generate illumination to virtually light the scene, including the AR content. The location and type of illumination can be determined from captured image data, a light sensor, scene profile data, or another such source. As illustrated, the virtual light source in this example casts a significant amount of light from a particular direction, creating very strong shadows in locations different from those created by the overhead sunlight in FIG. 1A. Accordingly, the AR content can be rendered to have the appearance of being lit from that direction and with that intensity. A shadow for the AR object can also be rendered, separately or as part of the same object, for display with the scene data. In this example, AR content is also generated to provide realistic shadows for the physical objects in the scene. For instance, the physical ball 146 represented in the scene data has a new shadow rendered 144 that appears to have been a result of the illumination from the identified light source. In order to improve the realism, AR content can be rendered that masks or covers the physical shadow actually represented in the captured image data, such as is illustrated by the corresponding shadow 106 for the ball 104 in FIG. 1A. In this way, the entire image 140 appears illuminated consistent with the specified lighting state.

"Lighting state" as used herein refers to any aspect of a light source, physical or virtual, that may impact the illumination of any portion of a scene represented in image data, or any augmented reality object rendered into such a scene. This can include, for example, a number of active or non-active light sources, as well as the position (in one, two, or three dimensions) of each of those light sources with respect to the scene, or a reference coordinate or coordinate system. This can also include additional information for each identified light source, such as a color, brightness, range or set of active states, intensity, variability, light type (e.g., LED or fluorescent), etc. The lighting state in some embodiments can also include information such as time and location, which can be used to determine information about available lighting from the sun or moon, or another such source. In other embodiments the time and location information can be used to determine information about the location and intensity of the light source, such as the sun, at that time and location, which can then be stored as part of the lighting state data. There may also be groups of settings or state options provided, as may relate to a subset of active lighting sources to be used for a scene. Various other lighting state data can be utilized as well as discussed and suggested elsewhere herein with respect to the various embodiments.

In FIGS. 1A-1C, the scene data can correspond to any appropriate location or region, as may correspond to a closed or otherwise defined space. Within this space may be a defined a gameplay field. This may correspond to, for example, a race track, sporting field, or fighting arena, among other such options. It should be understood that the gameplay field can be real and/or virtual, such as may correspond to an actual physical space having physical components, or can correspond to a determined region of a floor (or another such surface or area) where aspects of the field are virtual and only displayed through augmented reality content, among other such options. In such an example there may be multiple players, or viewers, each viewing augmented reality content in the game field (or other scene) using a respective augmented reality device. These devices can be any appropriate devices capable of displaying augmented reality content, such as may include smart phones, tablet computers, smart glasses or contacts, AR goggles, and the like. In some embodiments the AR content will be rendered over a live camera view captured by the device and displayed on a display screen, such as on a smart phone, but in other embodiments the content may be displayed over an actual view, such as for smart glasses. In various embodiments the devices will have at least some type of position and/or orientation determination mechanism, such as a global positioning system (GPS) sensor or electronic gyroscope, which can enable the view to be determined in such a way as to render the AR content with an appropriate angle, scale, and rotation, etc.

Each device can have a respective field of view that corresponds to a specific portion of the scene. For each device, only AR content corresponding to locations within that field of view will be rendered and displayed, at any given time, by a display of that device. In order to determine the angle and scale, as well as the point of reference for the field of view, the location of the device can also be determined. As mentioned, this can be determined using a GPS-based approach, or can use an iBeacon or triangulation-based approach, among others known or used for device location determination. The location information can help to determine the location of each device in the space, with respect to the gameplay field scene, and with respect to the other devices.

In order to make the AR content appear to be as realistic as possible, it can be desirable in many situations to further cause the rendered objects to appear to be positioned on, or with respect to, actual surfaces in the scene. This can include, for example, being positioned on a track, field surface, tabletop, or other object or element (physical or virtual) in the scene. Further, it can be desirable that these objects are all of the appropriate scale and location with respect to each other, and that these relationships remain consistent unless intentionally varied within the game or content presentation. In order to provide such functionality, it can be desirable to map, model, or otherwise generate an accurate representation of the scene, so that the content can be rendered appropriately with respect to that representation. While in some instances the scene may be a fixed and well-known set of objects that does not change, in other instances the scene may not be well known or may be able to vary throughout the game. In other embodiments the position and/or orientation of a respective device may be unable to be determined with sufficient accuracy to prevent any noise or error from being injected into the AR content as rendered.

It therefore can be desirable in at least some embodiments to determine the distance to various objects, locations, surfaces, and/or points in the gameplay field, or other appropriate area, for each individual device, such that the AR content is rendered and displayed appropriately for that specific device based on the current location and orientation. This can include, for example, capturing image data using a rear facing camera and analyzing that image data using a computer vision algorithm to identify the locations of specific types of surfaces, shapes, points, objects, or other such elements in the scene. Various algorithms can attempt to recognize various features and/or anchor points which can be used to identify surfaces, for example, which can be used as a reference for rendering AR content. Various other approaches can be used as well, as may include structured lighting, stereoscopic imaging, ultrasonic image, LIDAR scanning, and the like. Many portable computing devices or other consumer electronics may not have these and other such sensors or mechanisms, and thus may need to rely upon cameras or more basic data capture mechanisms.

Figure 2A:
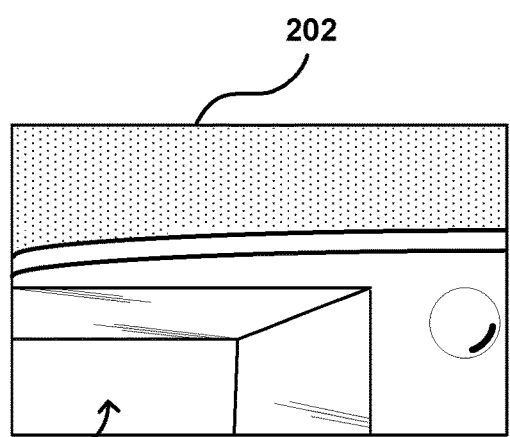
FIGS. 2A, 2B, 2C, and 2D illustrate an example approach to utilizing a point cloud for rendering augmented reality content that can be utilized in accordance with various embodiments.
Figure 2B:
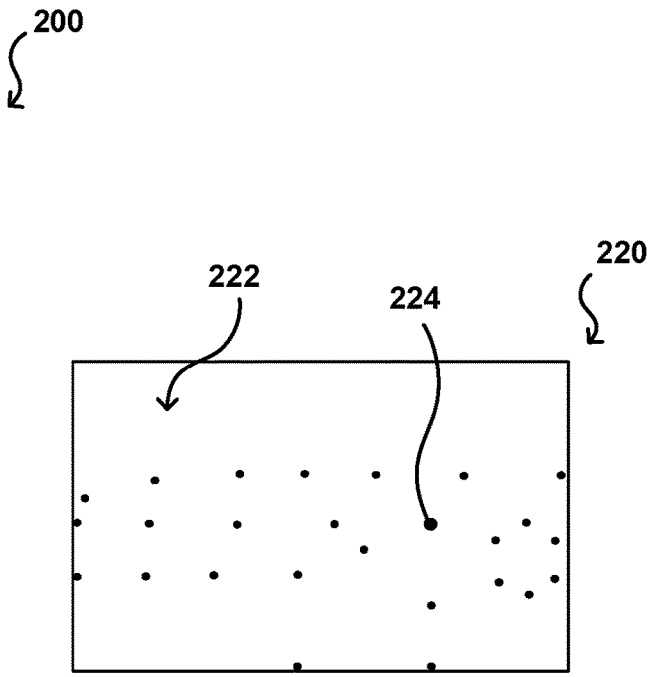

In various embodiments, the scene data to be analyzed from the various devices will correspond to positions of features detected from image or other data captured using a camera or other such sensor or component on each respective device. As illustrated in the example image 200 of FIG. 2A, for a given device image data may be captured that includes representations of various objects within a field of view of the camera or sensor, etc. In at least some embodiments, computer vision algorithms can be used to attempt to recognize objects, or at least differentiate between objects, in the image data and generate or determine representative data points. These points can correspond to unique or representative features, as known for computer vision applications. For a given image, a set of points can be generated as illustrated in the point set 220 of FIG. 2B, where the points can include feature points 222 and various anchor points 224, which can be used to identify specific objects in the scene. As known for various AR applications, anchor points can be used to identify surfaces or other contours or regions respect to which an AR element can be rendered. In various embodiments, each data point in the point set 220 can have coordinate data determined with respect to the device, such as an (x, y, z) or other coordinate set in two or three dimensions, which can be determined with respect to an axis having an origin at the sensor of the device. For example, an x value of 2.1 feet can correspond to 2.1 feet along the x direction from a camera sensor. In order to correlate the data from the various devices, the relative position and orientation of the devices can be determined. For example, the position data from FIG. 2B can be correlated to the gameplay field in FIG. 1A based on the determined position and orientation of the device as determined with respect to the gameplay field. Similar points than then be correlated, and an authoritative position for each point or object determined based on the correlated data.

Figure 2C:
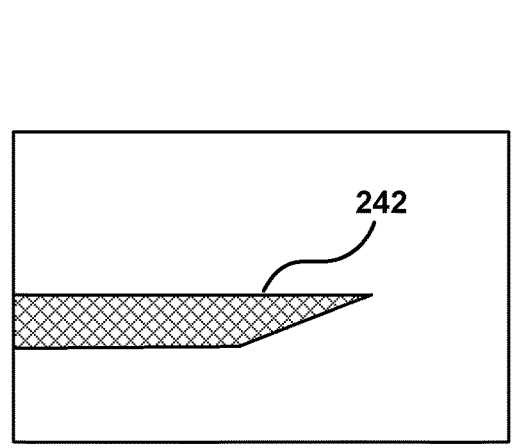
Figure 2D:
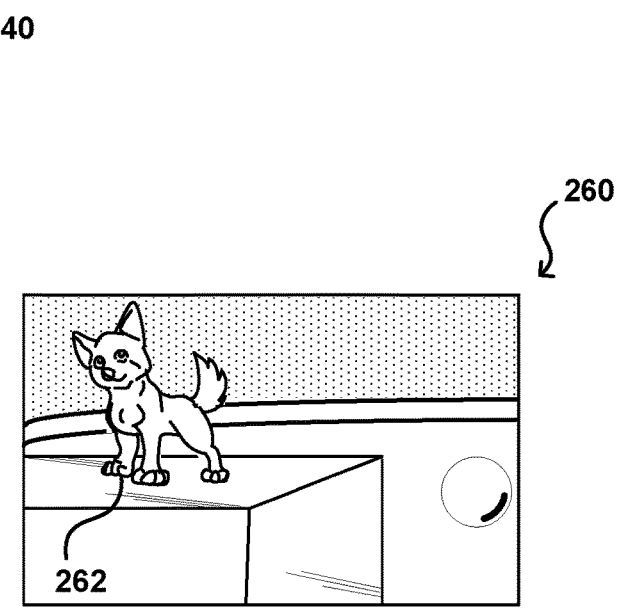

For various AR applications, it can be desirable to locate various surfaces, contours, or objects that can be used as reference points for rendering AR content. For example, various embodiments can attempt to locate surfaces, particularly relatively smooth and horizontal surfaces, that can serve as positioning locations for AR content. As an example, the data points from FIG. 2B (and potentially as aggregated or processed as discussed herein) can be analyzed to determine that there is a horizontal surface represented in the data. This can correspond to the box 204 or other such object represented in the image data. In response to detecting such a surface, and in some embodiments ensuring that various criteria are satisfied as may relate to size, angle, or smoothness, etc., a polygon 242 or other geometric shape or construct can be generated as illustrated in the example 240 of FIG. 2C. Information (e.g., coordinates) for this geometric construct can be determined on the device, or sent to the device, and used for placing rendered AR content. Sending geometric construct data can require much less bandwidth and memory than a full point cloud for a region, although in some embodiments point clouds can be used as well, or in place of the constructs. The constructs can have position and anchor points, for example, which can be used to define the location and shape of the construct. This relatively lightweight construct, definable using a relatively small set of points, allows for rapid adjustment in relative positioning based upon movement of a respective viewing device. This construct can be used as a reference for rendering AR content. As illustrated in the example image 260 of FIG. 2D, a live view of the gameplay field is displayed as captured by the camera. Based at least in part upon the position of the geometric construct, which would typically not actually be displayed on the screen but maintained as data in memory, can be used as a reference to render a character 262 or other AR element as an overlay with respect to the live view. As the device displayed the content changes position or orientation, the respective position of the geometric construct will change as well. This change can trigger a corresponding change in the rendering of the AR element 262, to maintain a consistent scale, position, and angle with respect to the geometric construct. In this example, the AR content can be rendered such that the dog is displayed to be standing on the box whenever the box is contained in (or near) a field of view of the camera of the device. While the dog or other character can move and perform various actions, its position in the gameplay field (or other such area) can be tracked with respect to at least one anchor point or construct, such that the rendering is consistent not only for a single device but across all devices accessing the AR content for that session and at or near that location.

As mentioned, in order to improve the realism of the augmented reality content it can be desirable to determine lighting state data for the scene that should be used to light or shade the AR object during the rendering process. The lighting state data can also provide the ability in at least some embodiments to adjust the appearance of the AR image, including the live view of the scene, by adjusting one or more aspects of the lighting state. In at least some embodiments, lighting state information can be obtained or determined using data from a number of different sources. One example source is the captured image data itself. The image data in some embodiments can be analyzed to determine information such as an average brightness and contrast value, or range of those values, for the image as a whole or a portion proximate a location for the AR content. The image data can also be analyzed to attempt to determine the direction of various shadows, such as by determining the longest axis or dimension of each shadow or dominant vector direction, to extrapolate the locations of various light sources that may not be represented in the image data. The image data can also be analyzed to attempt to determine light sources that are represented in the image data, and may analyze the locations of these light sources as represented in the captured image data while the camera (or device including the camera) undergoes orientation changes, such as rotations about an axis, and perform various geometric operations to attempt to determine the locations of those light sources. Other approaches to determining distance and position of objects can be used as well as discussed and suggested elsewhere herein.

Other types of information can be utilized as well. For example, a light sensor of the computing device may be used to determine an ambient light level for a scene, among other such values. Multiple light sensors, or sensors capable of determining values for different regions or directions, can also be used. In some embodiments, information about the time, location, date, and/or orientation of the device (or the camera on the device) can be used to calculate lighting information. For example, an outdoor scene during daylight hours may be primarily illuminated by sunlight. By knowing the geographic location and time of day, an estimate can be made as to the brightness of daylight available and the direction in which the sunlight is received, impacting shadows and other such aspects. Other information can be used to improve the accuracy as well, such as date information which can help to better determine the location of the sun relative to the scene. Information about the weather can also be used if available, and in some embodiments aspects of the image data can be used to determine lighting information. For example, if it is noon on a day when the sun should be directly overhead but the image data or data from the brightness sensor indicate that there is an unexpectedly low level of brightness or ambient light, then it can be assumed that it is a cloudy day or raining, etc. In some embodiments the image data can be analyzed to detect the presence of objects such as snow or water which can impact reflections, shadows, and overall brightness. Various other types of information can be analyzed or considered as well within the scope of the various embodiments.

The information about the various lighting sources, including position, intensity, color, and other such information, can be used to generate a light map for the scene. The light map in some embodiments can include a three-dimensional mapping of any or all determined sources of light that can contribute lighting to the scene. This can include light sources of one or more determined types in some embodiments, as may include the sun and light sources such as bulbs, LEDs, etc. In other embodiments this can include anything that can impact lighting and reflections, as may include snow, water, mirrors, bright objects, and the like. In addition to the position in three dimensions of a reference coordinate system, for example, information for each light source can be tracked and updated over time, such as whether the light source is active or appreciably contributing to the lighting of the scene. This can include, for example, the object having a relative brightness or other such aspect (s) that would impact the appearance of one or more objects in the scene, or the shadow(s) created by those objects. This can be based on a brightness or illumination threshold, or other such criterion. Other aspects such as the current color, intensity, or brightness can be tracked as well. For the sun, moon, or other mobile or non-stationary sources, the position information can also be updated over time as appropriate.

Figure 3A:
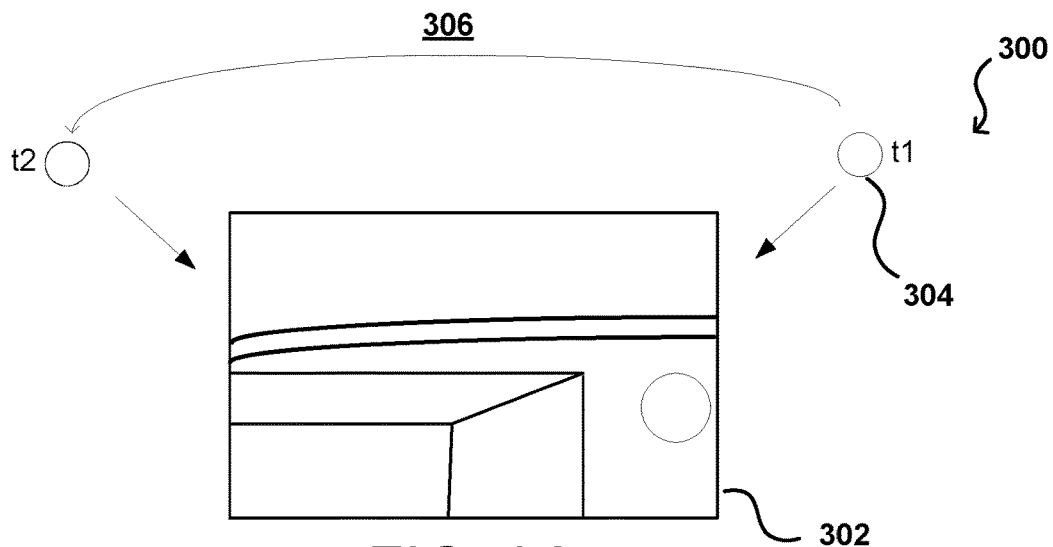
FIGS. 3A, 3B, and 3C illustrate example approaches to generating a light map for a scene that can be utilized in accordance with various embodiments.
Figure 3B:
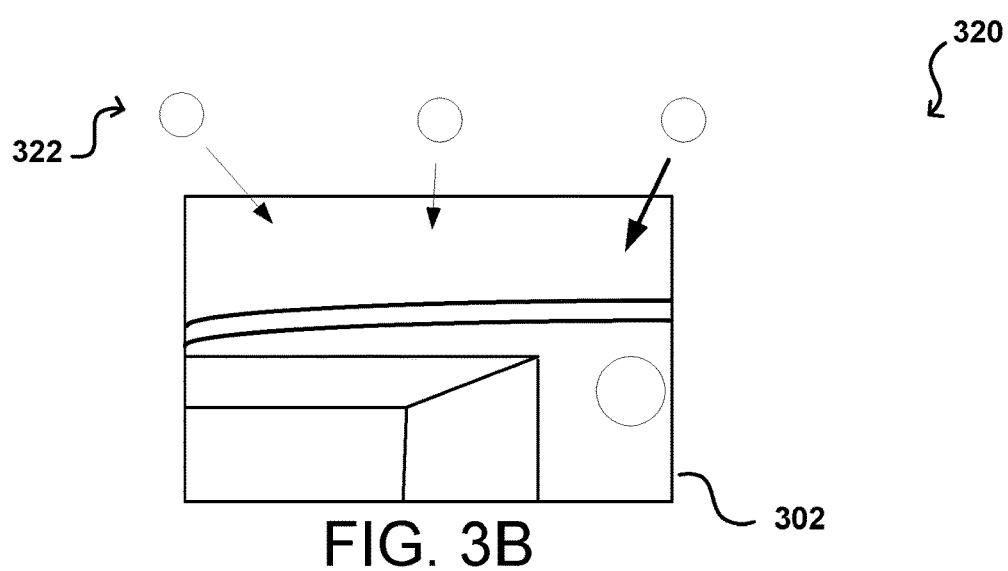

For example, the position of the sun relative to the scene may be set as part of the light map, then its position updated over time. In other embodiments, the sun may be specified as a light source in the light map, and its position defined by a function that accepts inputs such as geo-location, time, date, and orientation. As illustrated in the example 300 of FIG. 3A, the location of the sun 304 relative to the scene 302 would follow a path 306 determined by the rotation of the earth, and the relative location of the sun along that path would depend upon factors such as the time and date as mentioned. As illustrated, the location would vary by time, and the lighting information can be determined in part by inputting the relevant variables into the sun position function, which can be the same function or a different function that determines brightness or other characteristics for the sunlight. FIG. 3B illustrates an example situation 320 wherein three light sources 322 have been identified based on any of the processes discussed or suggested herein. The relative position of those light sources can be determined and stored to the light map, such that the amount of lighting, and directions of shadows that would be cast, can be determined for different lighting states.

Figure 3C:
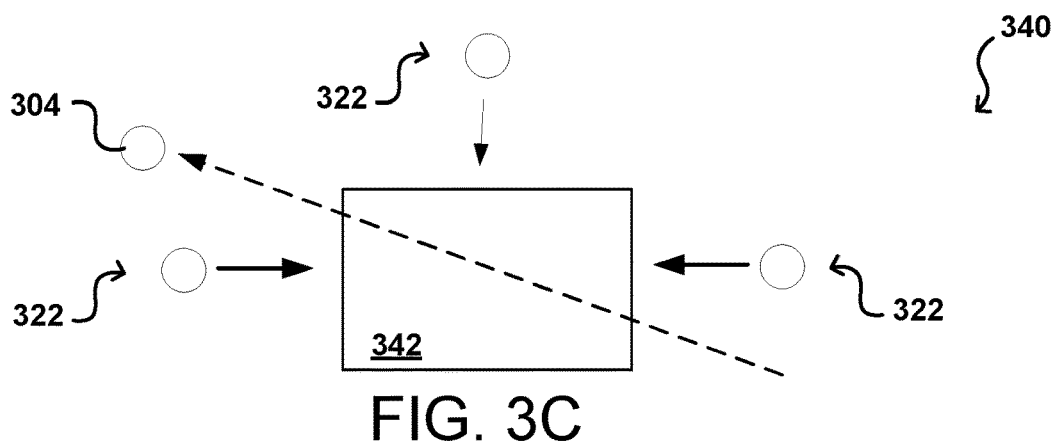

FIG. 3C illustrates an example light map 340 that can be generated for such a scene. This map 340 shows a top-down view, instead of the side views of FIGS. 3A and 3B. As illustrated, the relative locations of the light sources 322 to the scene (or gameplay field 342, etc.) are indicated, as well as the path of the sun 304 for at least the day in question, which can be used to determine the location based on the input time. As mentioned, for any or all of these light sources additional information can be tracked and/or stored, such as lighting state (e.g., on or off), color, brightness, intensity, variability, and the like. In some embodiments temporary or mobile light sources can be tracked as well using similar detection and determination techniques. These values for these parameters for the various light sources for the scene can be defined as part of the lighting state data. When a user wants to view the AR content under a different lighting state, the user can adjust any one or combination of these parameters to obtain the desired view.

Figure 4A:
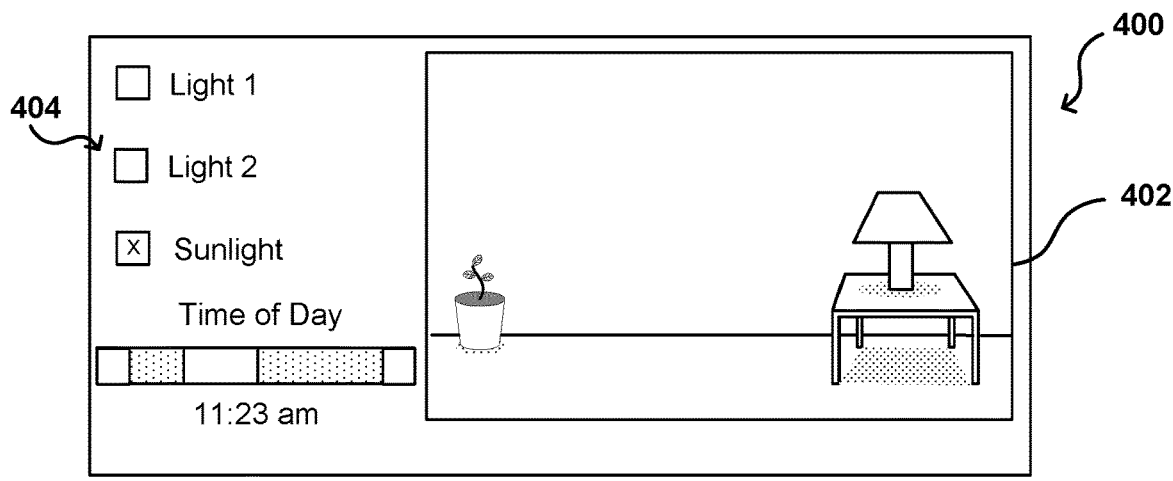
FIGS. 4A, 4B, and 4C illustrate example approaches to adjusting an indicated lighting state for rendering an augmented reality view that can be utilized in accordance with various embodiments.
Figure 4B:
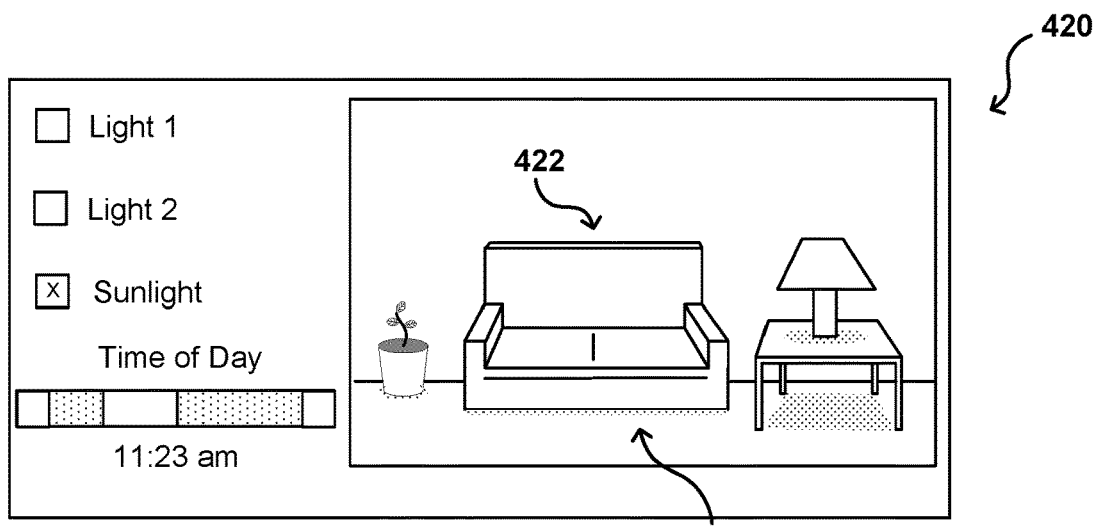
Figure 4C:
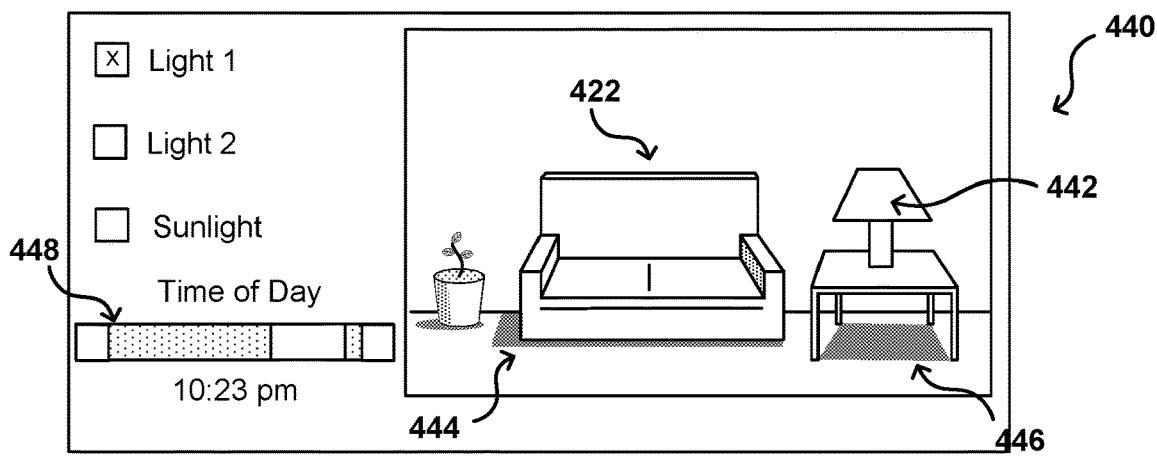

FIGS. 4A-4C illustrate an example interface flow that can be utilized to view AR content under different lighting conditions for different specified lighting states. In the interface state 400 of FIG. 4A, an image 402 is displayed which represents a live view of a portion of a scene, in this example corresponding to a room in a person's home. As mentioned, information for the scene can be determined from the captured image data, device sensors, and other such sources to determine a lighting map for the scene. This can include sunlight contribution data, as well as data for a lamp in the scene and an overhead light, such as may correspond to recessed lighting in a ceiling. The lighting state and light map can be generated and stored, at least during a current session, for use in rendering and displaying AR content. As mentioned, current lighting state and light map data can be generated for the scene. These can be used to determine current states or values for one or more lighting options 404 that can be presented to the inventor, A user can then adjust or specify alternative settings for any of these options to view the scene, and any AR content rendered for the scene, under different lighting conditions or for a different lighting state.

For example, in the interface state 420 of FIG. 4B, an AR object 422 corresponding to a couch offered for consumption (e.g., purchase or lease) has been placed in the scene. As discussed, this can include analyzing the image data to determine position and scale data, and using this information to render a size-appropriate version of the couch in an appropriate location with respect to the scene, as may be altered by the user in at least some embodiments. In order to make the appearance of the AR object 422 in the scene as realistic as possible, the lighting state and light map data can be used to illuminate and/or shade the AR object in order to have the appearance of the AR object be appropriate for the lighting of the scene into which it is being rendered. As mentioned, this can include matching the rendering of the AR object 422 itself to the view of the scene, such that the couch appears as if it is actually physically located in the scene. The lighting information can also be used to generate one or more shadows 424, on or proximate the AR object, or as part of the object, in order to further improve the realism of the complete view of the scene including the AR object.

It might be the case, however, that the user or viewer wants to view the AR object in the scene under different lighting conditions. For example, the current view may be during the daytime with significant sunlight, but the user might most frequently be home or entertain guests during the evening when the lighting state will be significantly different. Accordingly, the user can be enabled to adjust one or more of the lighting settings 404 in order to specify a lighting state for which to render or adjust the view. In the interface state 440 illustrated in FIG. 4C, the user has indicated that one of the light sources 442, here a lamp, should be activated, and has indicated that no sunlight should be available for the rendering. This can be accomplished in a number of different ways, such as by unchecking a sunlight checkbox, or by adjusting a slider bar 448 to a time when no (or very little) sunlight would be available, among other such options. There can be different approaches provided, such as to account for a situation during daylight hours when blackout shades are drawn, where there would be significant sunlight available but the sunlight would be prevented from illuminating the scene. Various other lighting conditions or state data can be specified as well within the scope of the various embodiments.

In this example, the selections have indicated that the scene is to be rendered without sunlight impact, as with lighting from the single lamp. An approach in accordance with various embodiments would determine an amount of ambient light that would be available under those conditions, according to the light map and lighting state data, and can apply a digital filter to the image to adjust the apparent brightness, color, or other aspects of the image. As illustrated in FIG. 4C, the view of the scene in the interface state 440 is less bright overall than the view displayed in FIG. 4B. This can result from a single filter being applied to the entire image, or different filters being applied to different portions, among other such options. Various digital filters can be applied that can alter the appearance of an image to appear to have been captured under different circumstances as known in digital photography.

The lighting state data can also be provided to a rendering platform, or rendering software, for purposes of rendering a view of the AR object 422 that is not only to scale, but also rendered with an appearance that matches the specified lighting state. As illustrated in FIG. 4C, the object 422 has a similar brightness in appearance to other objects in the scene, with the exception of the light source and potentially nearby objects, etc. The shadow(s) 444 for the AR object can be generated using this lighting state data as discussed elsewhere herein.

In order to further enhance the realism of the image, the AR application can be configured to modify the appearance of shadows for the scene using AR content. As discussed, AR content can correspond to a layer of objects that are overlaid onto the scene data in some embodiments to appear as objects within the scene. Taking such an approach, the AR application can determine shadows that would be generated by various objects in the scene for the specified lighting state and can generate AR objects that can be used to represent those shadows 446. These shadow objects can then be rendered as AR objects placed virtually into the scene. It is possible, of course, that there will have been existing shadows in the scene under the actual, current lighting conditions. Approaches in accordance with various embodiments can determine which portions of those shadows would have changed for the specified lighting state, and can determine how corresponding portions of the scene would appear. The application can then render objects corresponding to these regions that, when rendered into the image data, will give the appearance that the prior shadows are no longer present in the scene data. This can include, for example, filling the shadow region with a pattern matching the carpet, flooring, paint, texture, or other content contained in that region of the scene, where the appearance can be adjusted to match similar content proximate that region in the scene. In this way, the displayed shadows can appear to adapt with changes in the specified lighting conditions even though the actual shadows for real world objects represented in the captured image data will not change other than due to variations in the actual current lighting conditions.

In at least some embodiments lighting information can be obtained by sampling various APIs, or other interfaces, available through the system. This can include APIs on a client device or on a central server, among other such options. The lighting information can then be used during a lighting pass of the rendered to attempt to match the appearance of the image data for the scene. In some embodiments the data can be used, as mentioned, to generate a light map or other mapping of the available (or otherwise detected) light sources for a scene. In some embodiments the mapping is generated using a discrete cosine table or other transform. Various approaches can be used advantageously with applications that utilize deferred rendering, where shading of the AT content is not performed in a first pass of the pixel and vertex shaders but in a subsequent pass. Such an approach can take factors such as the depth of the world and the relative impact of various lighting sources to perform more realistic lighting calculations. Such an approach can not only allow for views under different lighting conditions, but also for conditions that might not be possible in the current location, such as to view an item in broad daylight where the object is being imaged in a building or room with no windows, etc. In many embodiments the resource-intensive portions of the process, such as the generation of the light map and determining of various rendering conditions, can be performed on a remote server or "in the cloud," with the instructions or data then being sent back to the display device for rendering. In other embodiments the calculations might be performed on the device itself using a high speed graphics processor (GPU) or other such component. Various other approaches and resources can be used as well within the scope of the various embodiments.

Figure 5:
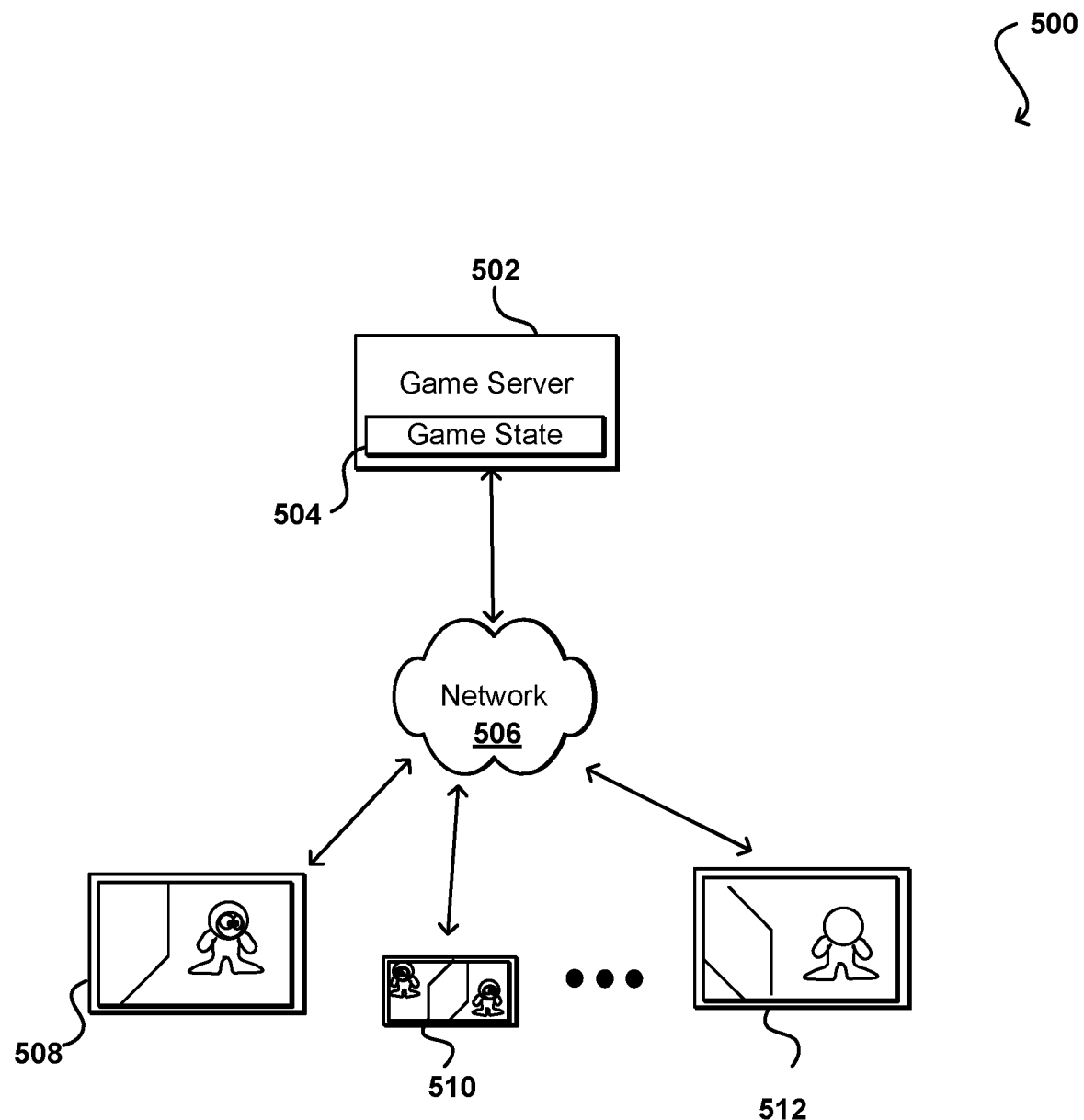
FIG. 5 illustrates players to a multiplayer online gaming session that can be developed in accordance with various embodiments.

As mentioned, in some embodiments this data can pass be sent from the various devices 580, 510, 512 for an AR session to a central server 502, or other such system or service, as illustrated in the example system 500 of FIG. 5. While a game server is discussed in this example, it should be understood that any server dedicated or allocated to an AR-inclusive session can be utilized as well within the scope of the various embodiments. In this example, a gaming application is hosted on at least one game server 502. The game server 502 can be a local gaming machine or a remote server operated by a game provider, among other such options. In this example the game offers multiplayer capability, whereby multiple players can utilize respective devices 508, 510, 512 to connect to the game server 502 over at least one network 506, such as the Internet, a local area network, a dedicated gaming network, a peer-to-peer network, or a cellular network, among other such options and combinations thereof. The players can join in a session of the game with state data that is managed by a game state component 504 of the game server. In some embodiments one or more game servers 502 can execute the game, while in others the servers can manage game state for instances of the game executing on the various player devices 508, 510, 512. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 502 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices. This can include, for example, maintaining an authoritative point cloud, set of position information, or set of geometric constructs for a gameplay region, such as a room, area, or arena as discussed herein. The server 502 can build up this information using data received from the various devices, and update the information based on updates to the received data. The server can maintain this point or construct data as part of the stored game state 504, and can send the information across the appropriate network(s) 506 to the various devices as appropriate, such as may be based upon the location and orientation of the device, and the corresponding field of view for which AR content can be rendered. In other embodiments, however, the position or construct data can be sent between devices independent of the game server 502, either through the network 506 or directly using a local communication protocol (e.g., Bluetooth or NFC). In situations where the data is sent between devices, the devices can either agree upon an authoritative data set or make local determinations for local rendering on the respective devices, among other such options.

In the example configuration of FIG. 5, the various devices can capture and analyze image or sensor data to generate point cloud and/or hit point test results, which can then be sent over the network(s) 506 to the dedicated server 502. The server can aggregate the data, based at least in part upon timestamps for the data as well as the relative locations and orientations of the respective devices. In at least some embodiments the positions can be geo-locations, while in other embodiments the locations can be with respect to a determined anchor or reference point in the gameplay area, among other such options. The server can utilize this aggregated data to generate an accurate impression of the gameplay (or other relevant) area, which can be maintained in a point cloud, model, set of geometric constructs, or other such representation. The server 502 can then relay some or all of this information to the various connected devices 508, 510, 512 that are involved in a session for an augmented reality application, game, or other presentation. The data can be sent for the entire area, and updated as appropriate, or can be sent as needed based upon the field of view of the device and the respective portion of the area to be used for AR rendering. As mentioned, such an approach can be used in games by using the aggregated data to render a scene in an environment that would be too large for one device to handle, and updating the rendered content based on both movement of the devices and a change in state of the game. A similar approach can be used for non-gaming applications, such as for informational or shopping presentations, where the AR content can be rendered and updated using a similar approach.

While discussed with respect to gaming, various other AR applications can take advantage of improved accuracy in position and other such determinations as well. For example, in a sporting event such an approach can be used to render information on a track or playing surface. In a store, such information can be used to render pricing or product information, views of persons or characters wearing or using various products, etc. For tourism, such an approach can be used to render information or characters in various locations, in order to provide information about the location or site. Various other approaches can be used as well, in situations where it is desired to render at least some amount of AR content, but the size of the space is too large for any single device to accurately map or determine the position and other distant information.

Such an approach can provide the benefit that rendering can be performed relatively well on conventional computing devices, but the accurate capture and determination of position information for nearby objects can be difficult and resource intensive, and can only be relatively successful for many devices. While transmitting and receiving position data can introduce some amount of latency, and consume some amount of bandwidth or data transmission, the impact can be minimal due to the type of data transmitted and the fact that for most device motions the change in view will not exceed the latency, such that small variations can be handled using the data already stored by the device. A server, with its significantly greater capacity, can quickly generate a more accurate point cloud for the respective area and send that point data to the devices. In some embodiments this can involve sending only the delta information, as much of the information will not change between display frames or will only change upon a change in game state. Further, once the majority of the point cloud data for a region has been transmitted to a device, such as for the interior of a stadium, there may be very few changes to the cloud made, and the orientation of the device can be used to determine the appropriate rendering location, angle, etc. Thus, while in some embodiments the server may generate an authoritative rendering for the AR content and send the relative portions down to the devices, in others the server may send the relevant position, geometric constraint, and/or anchor data for use by the individual devices in rendering the relevant portion locally.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

Figure 6:
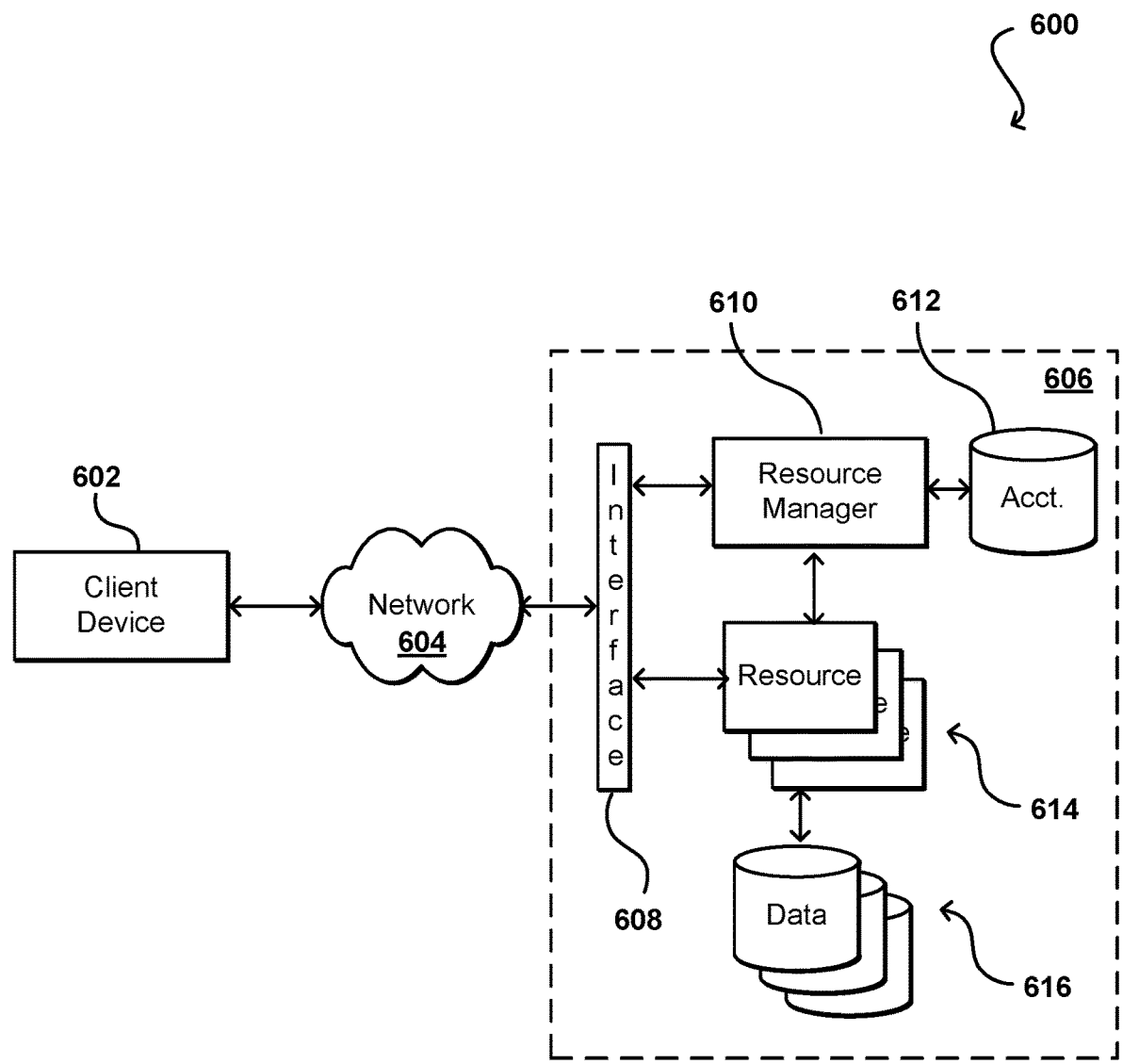
FIG. 6 illustrates an example environment in which various embodiments can be implemented.

FIG. 6 illustrates an example environment 600 in which aspects of the various embodiments can be implemented. In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
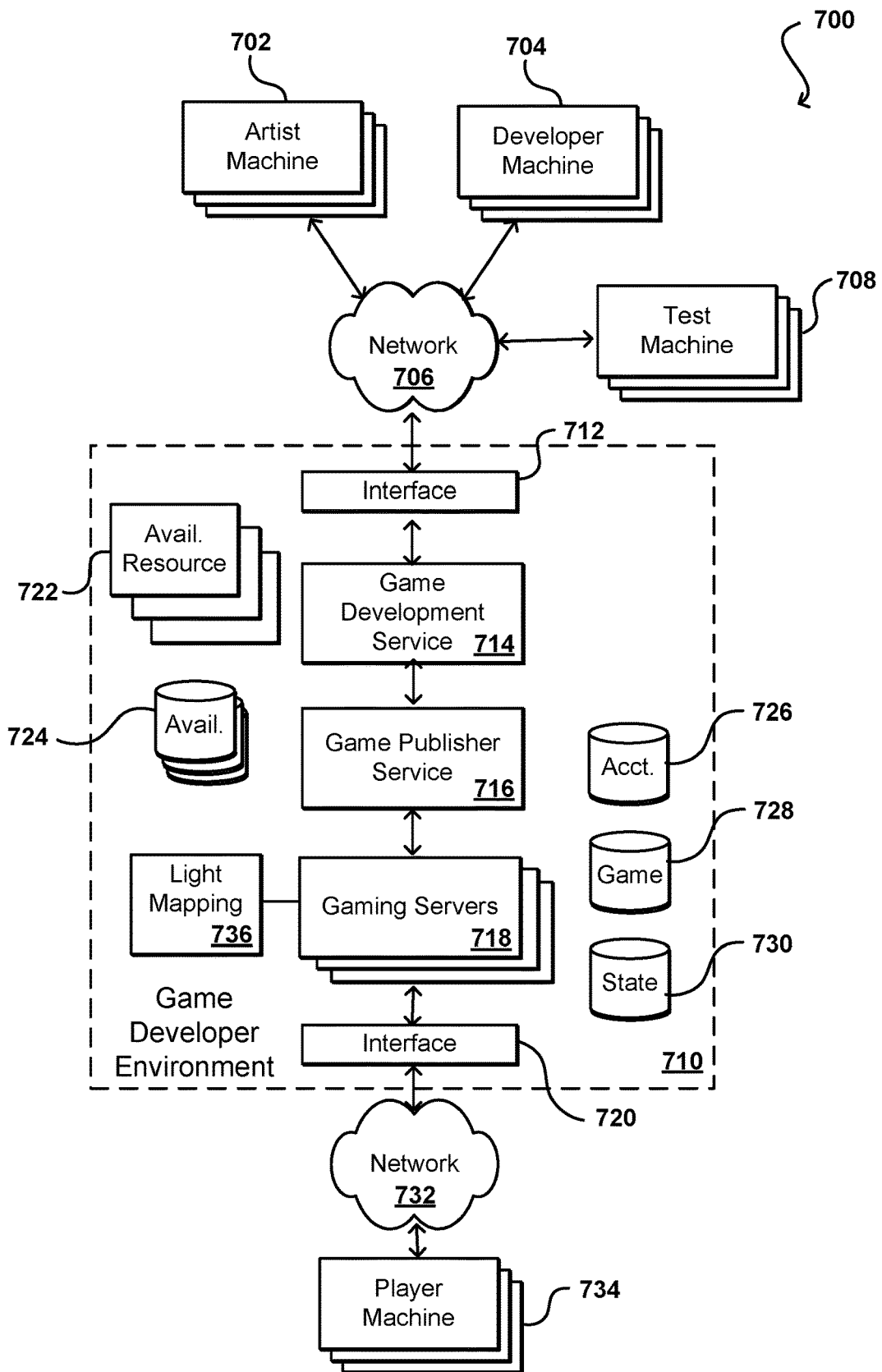
FIG. 7 illustrates an example gaming pipeline that can be used in accordance with various embodiments.

As illustrated in the example system 700 of FIG. 7, at least some of the resources can be used to support platforms and services useful in the development and providing of electronic gaming and three-dimensional graphical content, among other such options. For example, the artist machines 702 and developer machines 704 can collaborate via a game development service 714, which can be provided by a set of resources in a game developer environment 710, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 728, where the repositories can include graphics files, code, audio files, and the like. The game development service 714 can also work with an account manager, or at least maintain information in an account data store 726, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 716. The game publisher service 716 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 704 or otherwise. In some embodiments the game content might be published and made available to one or more test machines 708, which may be associated with the customer, such that the customer can test various builds or versions of the game. In some embodiments feedback provided by the test machines 708 may be provided to the game development service 714, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 718 which can run the game and enable player machines 734 to access the game content over one or more networks 732, which may be different from the network(s) 706 used for game development. This can include, for example, dedicated gaming networks, the Internet, cellular networks, and the like. The player machines 734 can communicate with the appropriate interfaces of an interface layer 720 to obtain the gaming content. In some embodiments the player machines 732 will download the gaming content for execution on the individual machines, and will upload (or otherwise communicate) gaming data, messages, and other information to the gaming servers 718, as well as to other players, social networking sites, or other such recipients. The gaming servers 718 can cause state information for the various instances of the game to be stored to at least one game state repository. This can hold state for the game as a whole or for individual game sessions, among other such options. As mentioned, in some embodiments the devices can send position or image data to a dedicated gaming server 718 or other component in the game developer environment 710, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 734 in order for those devices to render the appropriate AR content for the location and orientation of a given device. In some embodiments the game content can be executed by the game servers and streamed in near real time to the player machines 734. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the gaming servers 718 or other such systems, services, or components can utilize a surface mapping service, for example, that is able to receive position, orientation, and object location data, among other types of data discussed herein, and generate an authoritative mapping of a specific area or region, such as a gameplay region. In this example, each player device 734 can send the information to an allocated gaming server 718 for the gaming session, which can then communicate the relevant information with the surface mapping service so that the surface mapping service can update the authoritative data set as appropriate, as well as to obtain from the mapping service any relevant position or other data that should be sent to one or more devices based on, for example, changes in the orientation or location of the device, as well as for changes of other objects or positions in the mapped region as well. As mentioned, in some embodiments the information can be sent as needed for a current view of a player device, and at least some of that data can be retained in cache or memory on the device such that only changes to the data need to be transmitted, and in some embodiments the devices can each build a model of the mapped region over time. As mentioned, in some embodiments the player devices 734 can communicate with each other as well, such as to send updates in player device location or orientation, or to communicate updates in the authoritative data set, among other such options.

As mentioned, in some embodiments the mapping data for a region can correspond to a set of data points in a defined coordinate system, often referred to as a point cloud. Other representations can be used as well, such as a model or mesh, set of point vectors, etc. In some embodiments a set of geometric shapes for surfaces or objects of interest can be utilized instead or, or along with, a point cloud or other data set. A point cloud can often contain a set of unique or representative data points that are determined for objects in a region or scene that has been imaged or otherwise had data captured by one or more devices. In at least some embodiments point cloud data is captured on the various devices, for relative fields of view, and then aggregated into an authoritative point cloud by the surface mapping service and/or gaming server. The relevant authoritative point cloud data can then be transmitted to the various player devices. In some embodiments, however, the gaming applications executing on the player devices may not be able to directly utilize the point cloud data for rendering, such that geometric primitives or other data is transmitted to the player devices for use in rendering content. In such cases, the point cloud data can be processed by the surface mapping service 736, for example, to generate a useable form such as may correspond to a 2D or 3D mesh, surface model, or set of geometric shapes for specific surfaces, among other such options. In some embodiments a network of triangles for a mesh can be generated using the point cloud, where the relative triangle point data can be transmitted to the relevant player devices. Various processing approaches such as data compression and multiple point sampling can be used as well in accordance with various embodiments.

As mentioned, the data sent by the various player machines can include location and orientation data. This can include, for example, GPS or other position data, combined with orientation data based on gyroscopes, compasses, or other such sensors or devices as discussed herein. The data can also include relative data as may be based upon a beacon or other such communication transmitted between the devices themselves. Beacons in some embodiments can be emitted by a Bluetooth low energy (BLE) or other such device that can broadcast identifiers, or other such information, that can be received by nearby receivers. Such an approach enables portable electronic devices, such as smart phones and tablet computers, to communicate when within a determined proximity. In some embodiments a beacon includes a universally unique identifier that can be interpreted by a compatible application, where the identifier and associated data can be used to determine the physical location of the device. Such an approach can also be used to generate or trigger location-based actions or functionality. Beacons can be useful when in indoor locations where GPS and other positioning approaches may not be as accurate.

In some embodiments the software can analyze data for a scene as captured by one or more devices and attempt to determine specific types of surfaces in the scene, such as flat or substantially horizontal surfaces. The software on some devices can analyze captured image data to identify and track planar surfaces corresponding to objects such as tables and floors, which can be used as reference points for rendering, for example, AR content. In some embodiments data from the camera sensor can also be used to determine an amount of ambient light in order to attempt to properly apply lighting or shading to the rendered objects. In one approach visual-inertial odometry can be used to combine information from the sensors on the device with computer vision analysis of the image data to recognize specific types of features in a scene and track the position across frames of image data. Hit testing can be performed as well in some embodiments to attempt to locate AR anchor positions in the captured image data, for purposes of rendering an AR overlay with respect to one or more of those positions. As mentioned, however, the accuracy of data captured by an individual device can be limited to a relatively small region, such that various embodiments can apply these and other approaches to the data set aggregated from the various devices. In other embodiments, however, the gaming server or surface mapping service 736 can provide the authoritative point data and the analysis of the surfaces and anchor points can be performed on the individual devices, only with respect to the authoritative data instead of the device-specific captured data.

The example system also includes a light mapping component 736, such as may be implemented as a web service or sub-system, that can be utilized in accordance with various embodiments. As mentioned, the environment can receive image data for a scene from one or more player devices 734 or other such sources. This data can be analyzed, along with time and location data, data from various APIs, sensor data from the devices, and other such data, for purposes of generating a light map for the scene, as well as to determine information for the current lighting state of the scene. As mentioned, this can include determining information such as a number of light sources, as well as the relative (or absolute) locations of those light sources to the scene. The light mapping component 736 can provide this information to the gaming servers 718 in this example in order to properly render the AR content to have a realistic appearance with respect to image data for the scene, as discussed elsewhere herein. The lighting state to be used for rendering may be different than that for the captured scene data, however, as may be specified by a gaming application or other such source. Accordingly, the gaming server can provide the appropriate information from the light mapping service 736 to enable the player devices 734 to render the AR content and view of the scene according to the specified lighting conditions. As mentioned, this can include applying at least one filter to the image data, determining the lighting or shading to use for rendering AR objects for the scene, and generating AR content that adjusts the shadows or other aspects of physical objects represented in the scene, among other such options.

Figure 8:
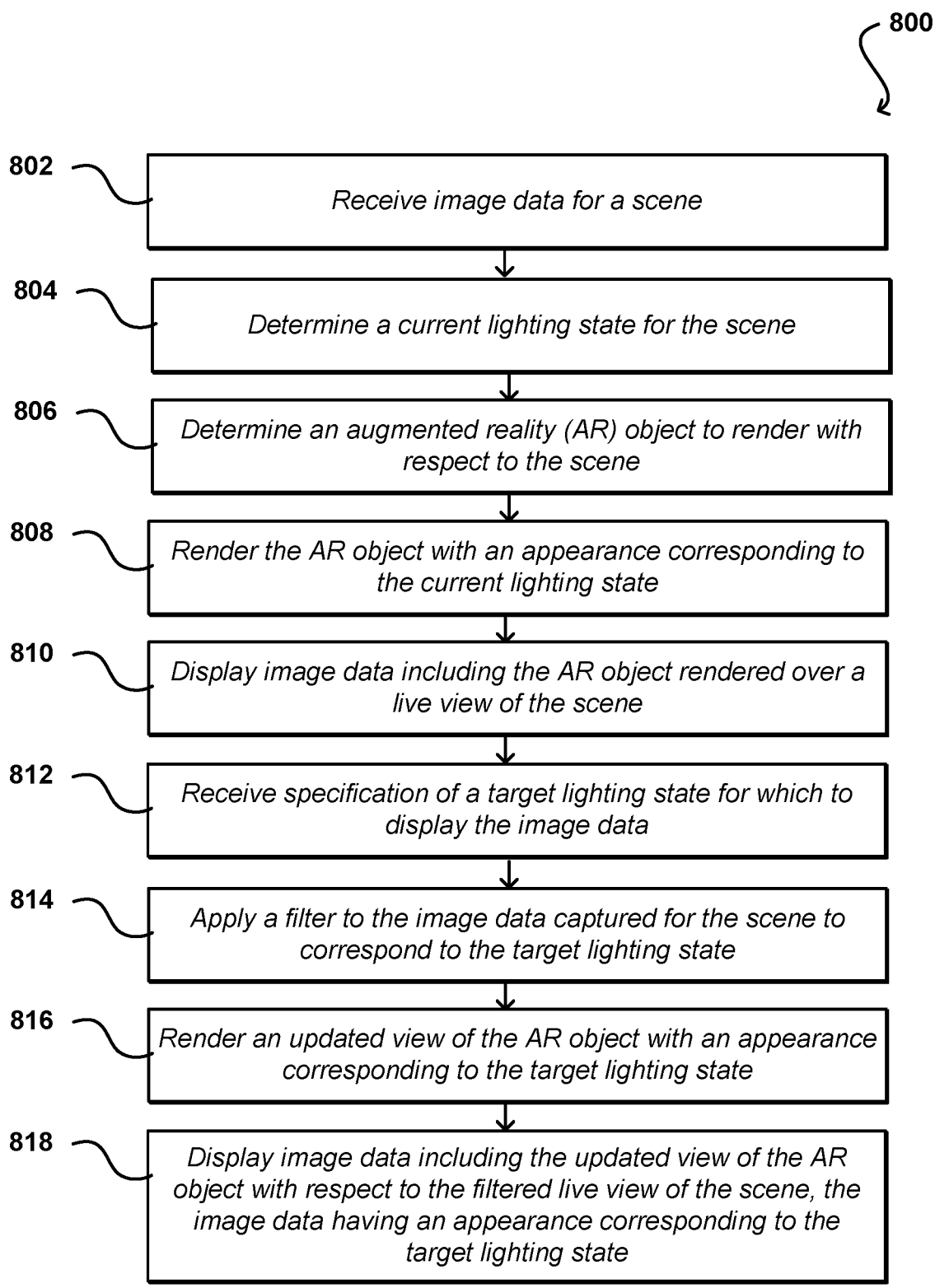
FIG. 8 illustrates an example process for rendering augmented reality views for different lighting states that can be utilized in accordance with various embodiments.

FIG. 8 illustrates an example process 800 for simulating a change in lighting state for an augmented reality view that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well as discussed and suggested herein. In this example, image data is received 802 for a scene that may include representations of several physical objects. The image data in many instances will be received from a camera capturing the image data on a computing device which will also display a live view of the image data on a display device. A current lighting state for the scene can be determined 804. As mentioned, the lighting state can include values for various types of parameters determined in a number of different ways. For example, the lighting state can include overall brightness and contrast values determined from the image or a light sensor, and can include information about a possible sunlight contribution based upon time and location information obtained from a GPS sensor, internal clock, and/or other such source. Orientation information can also be received from an electronic gyroscope or other such sensor. Information about surrounding light sources can be determined from the captured image data among other such approaches discussed and suggested herein. Various other information such as may relate to color, variance, and the like can be determined for the current lighting state as well. As mentioned, in some embodiments the determination of the current lighting state can also involve the generation of a light map that represents the relative locations of light sources determined for the scene.

An augmented reality application executing on the device can determine 806 at least one augmented reality (AR) object to render with respect to the live view of the scene. This can be any appropriate type of object as may be relevant for the context, such as an avatar for a gaming application or a product image for an e-commerce site, among other such options. The AR object can be rendered 808 with an appearance corresponding to the determined current lighting state. As mentioned, this can include using the lighting state data when performing a shading pass of a deferred rendering process in some embodiments. The image data including the AR object rendered with respect to the live view of the scene can then be displayed 810, such as on a display screen of the computing device. Subsequently, a specification of a target lighting state can be received 812, such as by receiving data for a target lighting state or a new value of a lighting parameter, among other options discussed and presented herein. In some embodiments a filter can be selected and applied 814 to the image data for the live view of the scene in order to cause the appearance of the live view to correspond to the target lighting state, such as to appear to be lit according to the light sources and values of the target lighting state. An updated view of the AR object can be rendered 816 with an appearance that also corresponds to the target lighting state. Thus, any lighting values changed in the target lighting state can be used to update the rendering in the corresponding shading pass. The image data can then be displayed 818 that includes the updated view of the AR object with respect to the "filtered" live view whereby the image data has an appearance that the AR object is located in the scene, and the object and scene are both lit according to the target lighting state.

Figure 9:
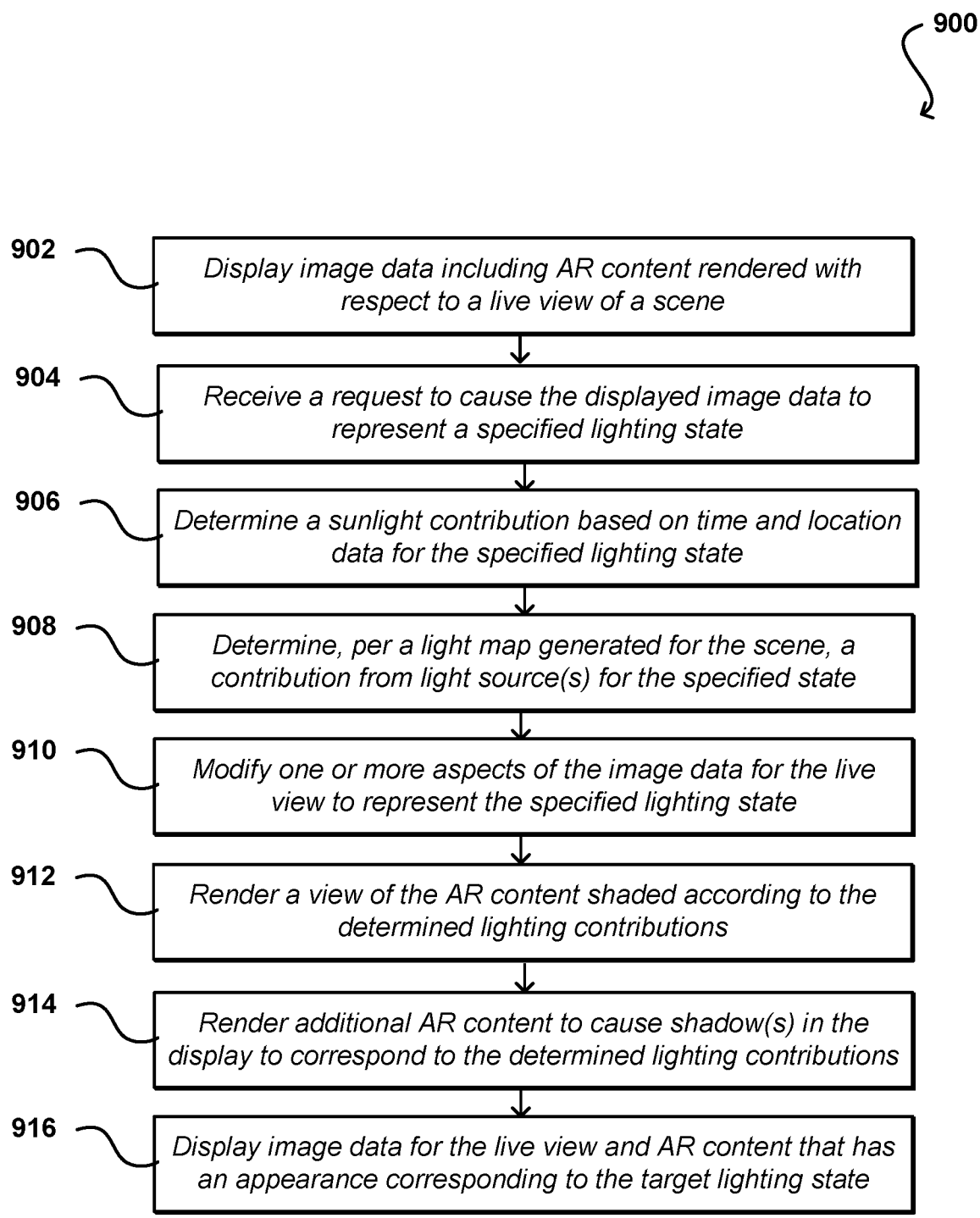
FIG. 9 illustrates an example process for rendering an augmented reality view for a specified lighting state that can be utilized in accordance with various embodiments.

FIG. 9 illustrates an example process 900 for updating an appearance of an augmented reality view for a target lighting state that can be utilized in accordance with various embodiments. In this example, image data is displayed 902 that includes AR content rendered with respect to a live view of a scene. It should be understood, however, that the view of the scene may not be a live view and in some instances can be a single image, among other such options. The AR content can be rendered as discussed herein to have an appearance that corresponds to the live view, including aspects such as size, scale, location, and lighting. A request can be received 904 to cause the displayed image data to represent a specified lighting state. As mentioned, this can include a change in at least one aspect of at least one lighting source for the scene. In this example, a sunlight contribution is determined 906 based at least in part upon time and location information for the specified lighting state. Other information can be used as well, such as device orientation, date, sunlight access, and the like. A contribution from one or more additional light sources can also be determined 908 for the specified lighting state, as may utilize a light map generated for the scene as discussed elsewhere herein. One or more aspects of the captured image data, or image data stream, for the live view can then be modified 910 to represent the specified lighting state. This can include, for example, applying a digital filter to increase or decrease an average or overall brightness of the image data. A view of the AR content can also be rendered 912 that is shaded according to the determined lighting contributions. This can include, for example, determining the locations and intensities of each active light source per the specified lighting state and shading the AR content accordingly. Additional AR content can be rendered 914 as well to represent one or more shadows that would be generated by the simulated light from the determined light sources for the AR object or objects in the live view. This can include not only adding shadows for the specified lighting state, but also removing or reducing shadows present in the live view of the data that correspond to the current lighting state. Image data for the live view and the AR content can then be displayed 916 that has an appearance corresponding to the specified lighting state. A user can continue to alter the lighting conditions or specify new lighting states to receive updated views that show the AR content in the scene under varying lighting conditions of interest to the user.

Figure 10:
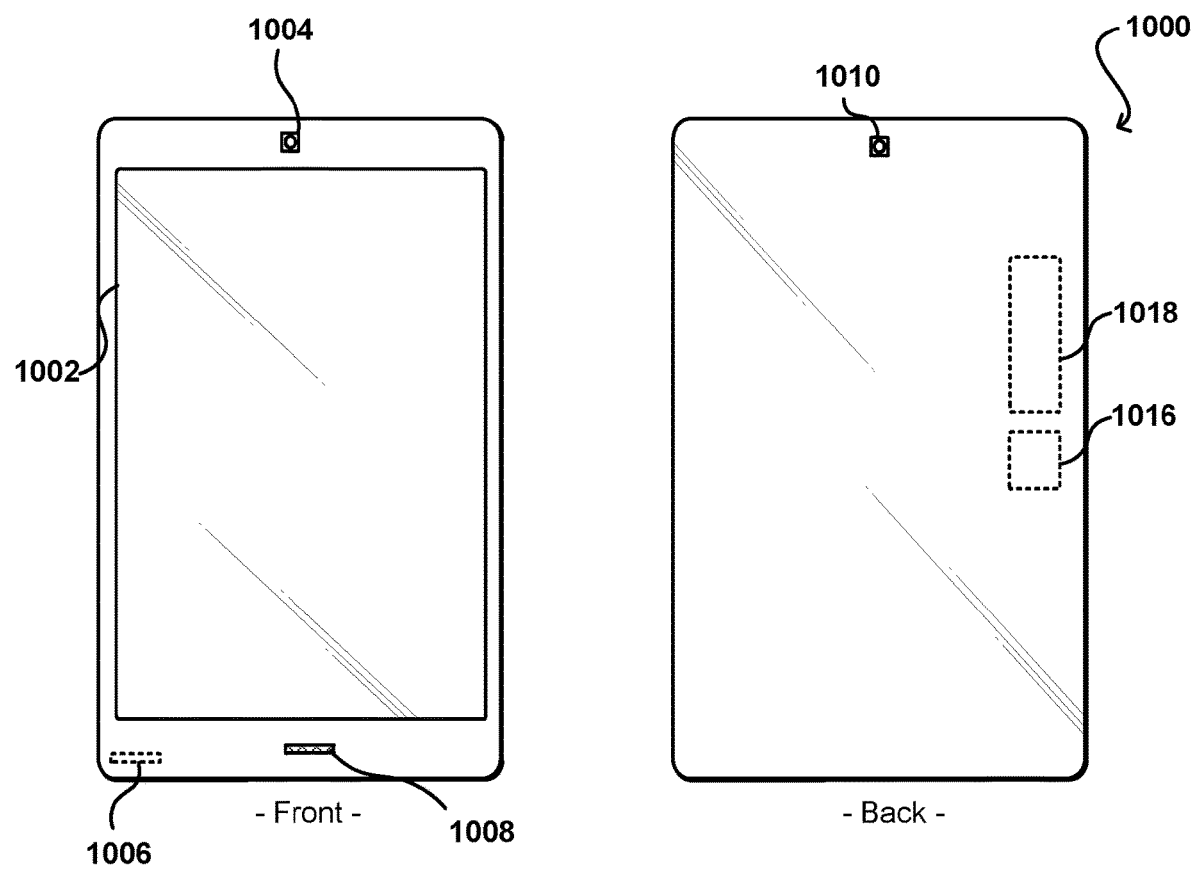
FIG. 10 illustrates an example computing device that can execute an augmented reality application in accordance with various embodiments.

FIG. 10 illustrates front and back views of an example electronic computing device 1000 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 1000 has a display screen 1002 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 1004 on the front of the device and at least one image capture element 1010 on the back of the device. It should be understood, however, that image capture elements could also, or alternatively, be placed on the sides or corners of the device, and that there can be any appropriate number of capture elements of similar or different types. Each image capture element 1004 and 1010 may be, for example, a camera, a charge-coupled device (CCD), a motion detection sensor or an infrared sensor, or other image capturing technology.

As discussed, the device can use the images (e.g., still or video) captured from the imaging elements 1004 and 1010 to generate a three-dimensional simulation of the surrounding environment (e.g., a virtual reality of the surrounding environment for display on the display screen of the device). Further, the device can utilize outputs from at least one of the image capture elements 1004 and 1010 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 1008 on the front side of the device. In some devices there may be only one microphone, while in other devices there might be at least one microphone on each side and/or corner of the device, or in other appropriate locations.

The device 1000 in this example also includes one or more orientation- or position-determining elements 1018 operable to provide information such as a position, direction, motion, or orientation of the device. These elements can include, for example, accelerometers, inertial sensors, electronic gyroscopes, and electronic compasses.

The example device also includes at least one communication mechanism 1006, such as may include at least one wired or wireless component operable to communicate with one or more electronic devices. The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

Figure 11:
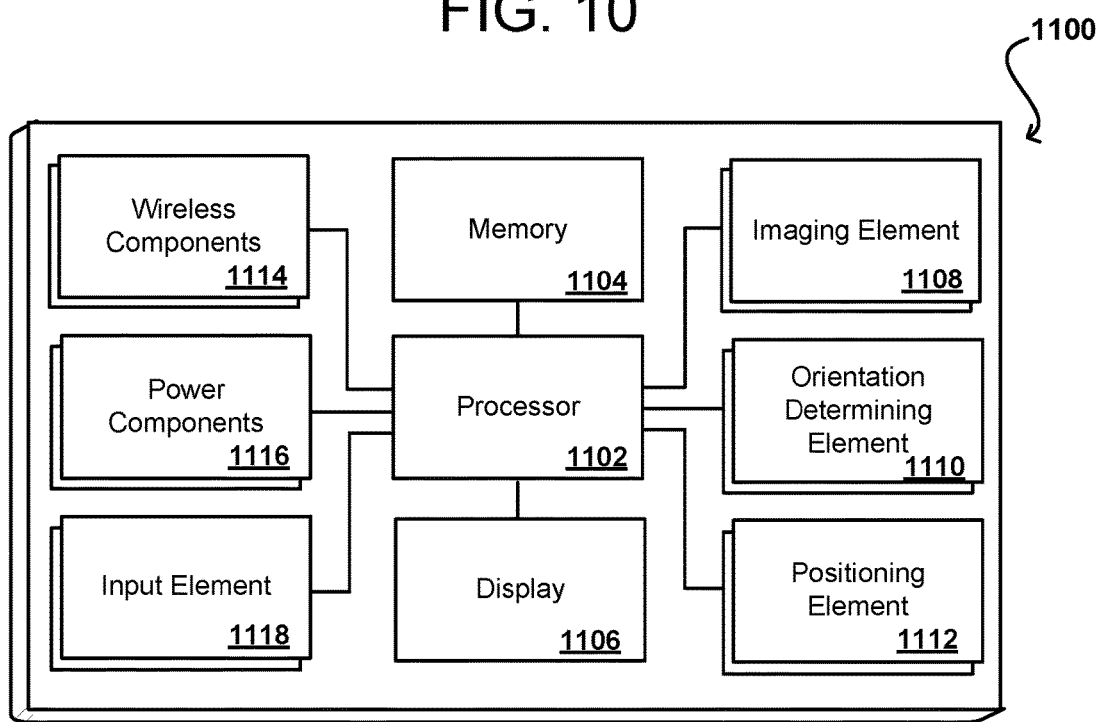
FIG. 11 illustrates example components of a computing device that can be used to implement aspects of the various embodiments.

FIG. 11 illustrates a set of basic components of an electronic computing device 1100 such as the device 1000 described with respect to FIG. 10. In this example, the device includes at least one processing unit 1102 for executing instructions that can be stored in a memory device or element 1104. As would be apparent to one of ordinary skill in the art, the device can include many types of memory, data storage, or computer-readable media, such as a first data storage for program instructions for execution by the processing unit(s) 1102, the same or separate storage can be used for images or data, a removable memory can be available for sharing information with other devices, and any number of communication approaches can be available for sharing with other devices.

The device typically will include some type of display screen 1106, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1108, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1100 also includes at least one orientation determining element 1110 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1100. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1112 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1114 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1118 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
   obtaining image data using a camera of a computing device, the image data including a representation of a scene;
   analyzing the image data to generate a light map for the scene, the light map indicating contributions to lighting of the scene for a set of lighting sources;

determining, based at least in part upon time and orientation information for the computing device at a time of capture of the image data, a portion of the light map attributable to sunlight;

receiving a request to render an augmented reality object in a display of the image data, the request specifying a target time of day;

determining an amount of the sunlight available at the target time of day;

applying a filter to the image data to cause the image data for the scene, when rendered, to have a brightness corresponding to the amount of the sunlight available at the target time of day;

determining, based at least in part upon the light map and the target time of day, lighting to apply for rendering of the augmented reality object; and rendering the augmented reality object as an overlay with respect to the displayed image data for the scene.

2. The computer-implemented method of claim 1, further comprising:

determining, using the light map, one or more shadows that would be present in the scene for the time of day;

determining a virtual shadow that would be cast by the augmented reality object in the scene for the time of day; and rendering the one or more shadows and the virtual shadow for display in the display of the image data.

3. The computer-implemented method of claim 2, wherein rendering the one or more shadows that would be present in the scene includes at least one of adding a shadow, removing a shadow, adjusting a darkness of a shadow, adjusting a shape of a shadow, or adjusting a placement of a shadow in the displayed image data.

4. The computer-implemented method of claim 1, further comprising:

generating the light map in part by determining positions for the set of lighting sources, the set of lighting sources being capable of providing illumination for at least a portion of the scene.

5. The computer-implemented method of claim 4, further comprising:

determining lighting to apply for rendering of the augmented reality object based further in part upon the set of lighting sources and illumination data specified for the set of lighting sources.

6. A computer-implemented method, comprising:

determining a set of light sources for a location;

determining a lighting state for which a view of an augmented reality object, with respect to an image of the location, is to be rendered for display;

determining settings for the set of light sources corresponding to the determined lighting state; and causing an image of the augmented reality object and a view of the location to be rendered for display with lighting determined according to the settings for the set of light sources.

7. The computer-implemented method of claim 6, further comprising:

causing one or more shadows, cast by the set of light sources with respect to the augmented reality object and one or more other objects in the scene, to be rendered into the image of the augmented reality object to be rendered for display.

8. The computer-implemented method of claim 6, further comprising:

enabling variation in the lighting state for the image; and adjusting the settings for the light sources, in response to the variation, for rendering the image.

9. The computer-implemented method of claim 6, further comprising:

capturing image data for the location; and analyzing the image data to determine the set of light sources.

10. The computer-implemented method of claim 9, further comprising:

generating a light map including position data for the set of light sources with respect to the location.

11. The computer-implemented method of claim 6, further comprising:

determining the lighting state in part by receiving indication of at least a time of day and determining an amount of sunlight available at the time of day.

12. The computer-implemented method of claim 6, further comprising:

determining the lighting state in part by receiving indication of a change in a value of at least one lighting parameter provided through an augmented reality interface.

13. The computer-implemented method of claim 12, wherein the at least one lighting parameter includes at least one of an indication of an active light source, an indication of an inactive light source, or a position of at least one active light source with respect to the location.

14. The computer-implemented method of claim 6, wherein causing the view of the location to be rendered for display includes applying at least one digital filter to image data captured for the location.

15. The computer-implemented method of claim 6, further comprising:

generating a depth map for the location, wherein causing the view of the location to be rendered for display includes determining a contribution of the light sources for objects at the location based at least in part upon position information for the objects in the depth map.

16. A system, comprising:

at least one processor; and memory including instructions that, when executed by the at least one processor, cause the system to:

determine a set of light sources for a location;

determine a lighting state for which a view of an augmented reality object, with respect to an image of the location, is to be rendered for display;

determine settings for the set of light sources corresponding to the determined lighting state; and cause an image of the augmented reality object and a view of the location to be rendered for display with lighting determined according to the settings for the set of light sources.

17. The system of claim 16, wherein the instructions when executed further cause the system to:

cause one or more shadows, cast by the set of light sources with respect to the augmented reality object and one or more other objects in the scene, to be rendered into the image of the augmented reality object to be rendered for display.

18. The system of claim 16, wherein the instructions when executed further cause the system to:

enable variation in the lighting state for the image; and adjust the settings for the light sources, in response to the variation, for rendering the image.

19. The system of claim 16, wherein the instructions when executed further cause the system to:

capture image data for the location;

analyze the image data to determine the set of light sources; and generate a light map including position data for the set of light sources with respect to the location.

20. The system of claim 16, wherein the instructions when executed further cause the system to:

determining the lighting state in part by receiving indication of at least one of a time of day having a determined amount of sunlight available or a change in a value of at least one lighting parameter provided through an augmented reality interface.

* * * * *